May 7, 1968     A. R. MAYER     3,382,500
COORDINATE CONVERTER

Filed May 26, 1966     3 Sheets-Sheet 1

INVENTOR.
BY ARTHUR MAYER

May 7, 1968  A. R. MAYER  3,382,500
COORDINATE CONVERTER

Filed May 26, 1966  3 Sheets-Sheet 2

INVENTOR.
BY ARTHUR MAYER

May 7, 1968      A. R. MAYER      3,382,500

COORDINATE CONVERTER

Filed May 26, 1966      3 Sheets-Sheet 3

INVENTOR.

BY ARTHUR MAYER

United States Patent Office 3,382,500
Patented May 7, 1968

3,382,500
COORDINATE CONVERTER
Arthur Mayer, Kew Gardens, N.Y., assignor to the United States of America as represented by the United States Atomic Energy Commission
Filed May 26, 1966, Ser. No. 553,608
2 Claims. (Cl. 343—117)

ABSTRACT OF THE DISCLOSURE

Coordinate converter for an airborne tracking system having an antenna for receiving signals from a ground beacon wherein input signals comprising stabilized elevation, azimuth, heading, pitch and roll work their way through two chains of servo-actuated resolvers forming a matrix toward the middle thereof to produce output elevation and azimuth error signals for moving the antenna to direct it toward the beacon.

---

This invention relates to an airborne tracker and more particularly to a coordinate converter for an airborne tracker having a six resolver chain that is divided in two and energized at both ends for receiving incoming signals that are combined to provide coordinate error signals for positioning a tracking antenna. This invention was made in the course of, or under a contract with the U.S. Atomic Energy Commission.

In the field of airborne tracking it is desirable to provide the air and/or ground coordinates of the aircraft relative to a ground beacon transmitting a continuous radio-wave information signal. Various methods and apparatus have been made and used for this tracking, comprising the use of airborne trackers having an antenna for detecting the ground signals wherein the antenna has been focused on the ground signal source with provision on the antenna pedestal for indicating the desired information. While these arrangements have been useful and can provide the desired information, they have been inaccurate, bulky, slow acting or inefficient. Furthermore, it has been desired to provide a continuous, compact, fast-acting, remote, mechanism for accurately and efficiently indicating the airplane coordinates relative to the beacon coordinates by providing a coordinate converter for converting stabilized elevation, stabilized azimuth, heading, pitch and roll angles into the proper elevation and azimuth angles of the antenna pedestal with a minimum of attenuation.

This invention provides tracking method and apparatus for aircraft moving up to the speed of sound or above, such as modern jet aircraft. The method and construction involved in this invention utilize standard and well known techniques and apparatus and are highly flexible for a wide range of aircraft, speeds and ranges. More particularly, this invention involves the use of an efficient matrix of resolvers each of which is positioned by a respective servo with a minimum of attenuation. This matrix is arranged in one embodiment with four variable transformers, two secant function potentiometers positioned by the pedestal elevation axis and phase trimming resistors wherein input signals, comprising stabilized elevation, stabilized azimuth, heading, pitch and roll angles work their way through a divided six resolver chain toward the middle thereof for combination to provide the desired elevation and azimuth error signals for the pedestal servo without the use of buffer amplifiers and while the excitation voltage attenuation is minimized. With the proper selection and arrangement of elements, as described in more detail hereinafter, the desired efficiency, accuracy and coordinate conversion are achieved.

It is thus an object of this invention to provide a method and apparatus for aircraft tracking;

It is another object to provide coordinate converter means in which the attenuation of input signals is minimized;

It is another object to provide a resolver chain that is energized without buffer amplifiers at both ends to minimize input signal attenuation;

Still another object is provision for continuous, accurate, compact, high speed, fast acting and efficient tracking means over a wide range of speeds and distances.

The above and further novel features and objects of this invention will appear more fully from the following detailed description when the same is read in connection with the accompanying drawings. It is to be expressly understood, however, that the drawings are not intended as a definition of the invention but are for the purpose of illustration only.

In the drawings where like elements are referenced alike:

Figure 1:
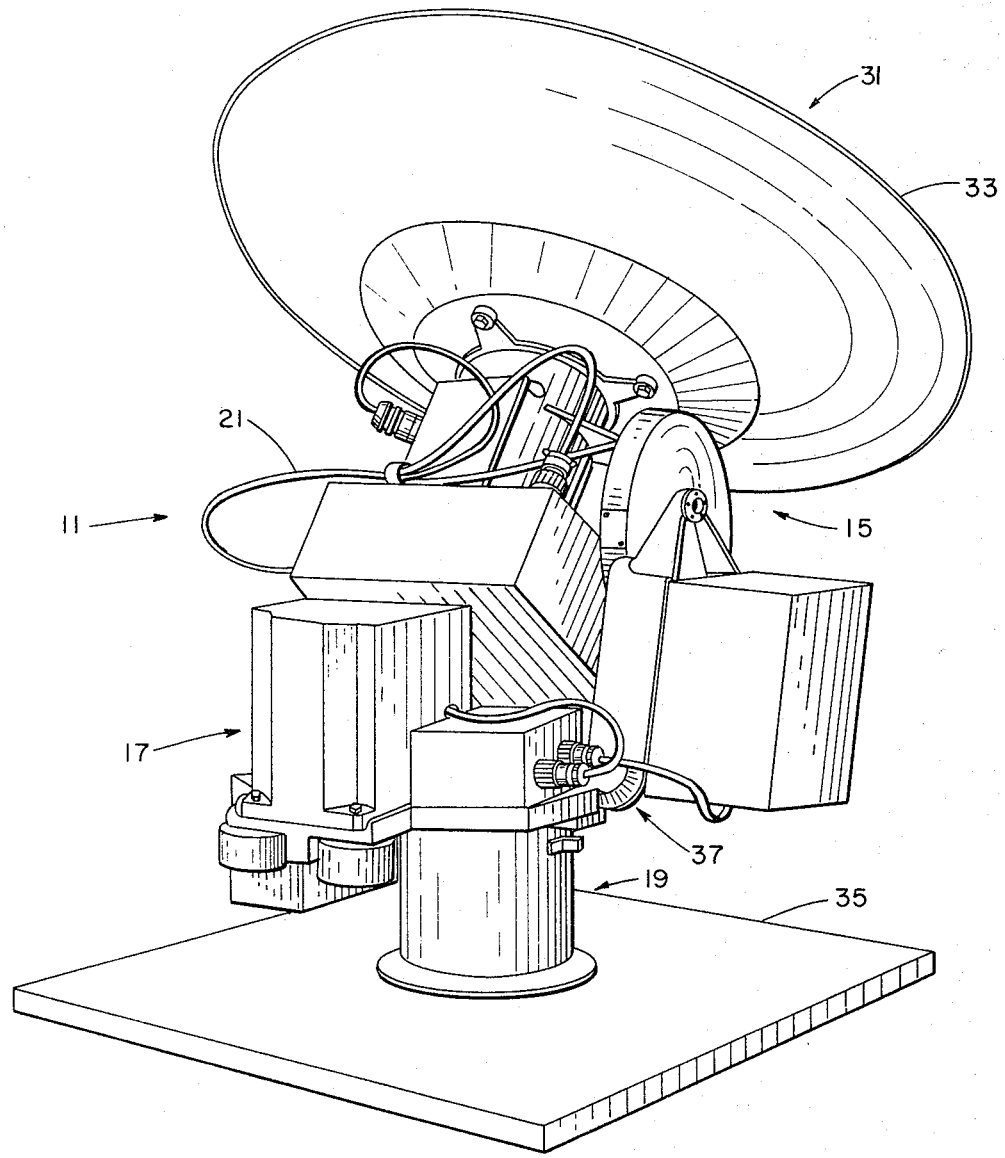
FIG. 1 is a partial three-dimensional view of the tracking apparatus of this invention.

Referring now to FIG. 1, tracking system 11 is mounted in a moveable craft (not shown) for receiving a continuous wave from a ground beacon (not shown) for determining the ground coordinates of the craft relative to the beacon. Advantageously, the craft is a high speed airplane, but the system of this invention is useful in any craft or apparatus for determining the coordinates thereof relative to a beacon. The major components of this tracking system are antenna 31, receiver chassis 15, servo-chassis 17, power supply 19 and connecting cables 21.

Figures 2, 4:
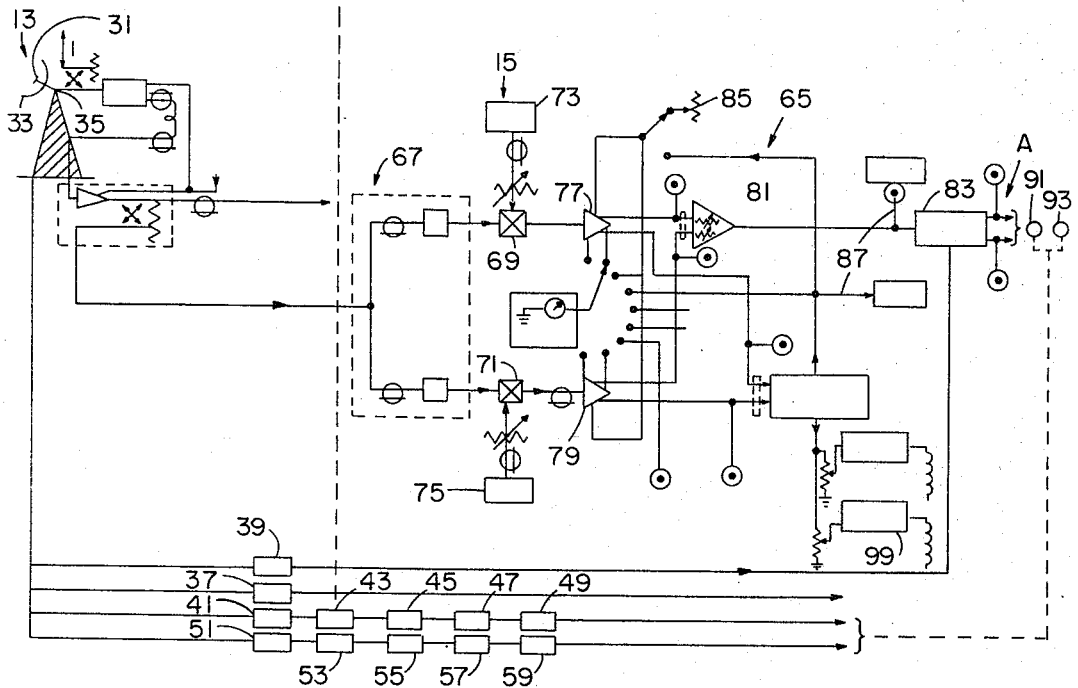
FIG. 2 is a partial schematic drawing of the antenna and receiving chassis of the tracking apparatus of FIG. 1.
FIG. 4 is a partial schematic drawing of the coordinate converter of the servo-chassis of FIG. 3.

Referring to FIGS. 1 and 2 the antenna 31 is part of C-band conical scanning antenna system 11, employing a 30-inch parabolic spun reflector 33 mounted on a pedestal 35 in an aluminum housing containing a hollow shaft 400-cycle three-phase scanner drive motor 37, reference generator 39, elevation synchros 41 having drive motor 43, tachometer 45, limit controls 47 and indicators 49, and azimuth synchros 51 having drive motor 53, tachometer 55, limit controls 57 and indicators 59. The hollow shaft motor 37 drives the vertex feed (not shown), which is mounted in the radome (not shown) to rotate the reflector 33 at the desired scanning rate (CCW as viewed in direction of RF propagation).

Referring to FIG. 2, the antenna 31 provides the reference generator output in terms of two sine waves with 90°±2° phase difference between the azimuth and elevation reference outputs. The antenna 31 by means of the conically scanned beam, provides a modulated RF signal at the scan frequency for receiver chassis 15, which comprises heterodyne 65 for detection, amplification and demodulation of this RF signal in the azimuth and elevation so as to produce at A an error signal for the servo chassis 17 for causing the servo motors to drive towards nulls. The heterodyne 65, comprises a diplexer 67, mixers 69 and 71 having appropriate local oscillators 73 and 75, intermediate frequency amplifiers 77 and 79, combiner amplifier 81 and angle error demodulator 83. Suitable control means 85, and metering means 87 are provided for the various receiver chassis signals. Rate memory means 99 also provides continuous monitoring of these signals whereby the antenna continues to move at the rate at which it moved when and if the beacon signal is lost. Also, if the target is not acquired during a given time interval, the system reverts to search mode centered about the last position of the antenna pedestal 35 after its rate memory displacement.

In the auto mode the servo chassis 17 receives the tracking azimuth and elevation D-C signals at A from the receiver, these signals being modulated with a 400 c.p.s. carrier for feeding to the stabilized azimuth servo 91 and elevation servo 93. These stabilized servos position syncho control transmitters, which deliver output analog data and transmit positional data to repeater synchros for driving front-panel dials (not shown).

Figure 3:
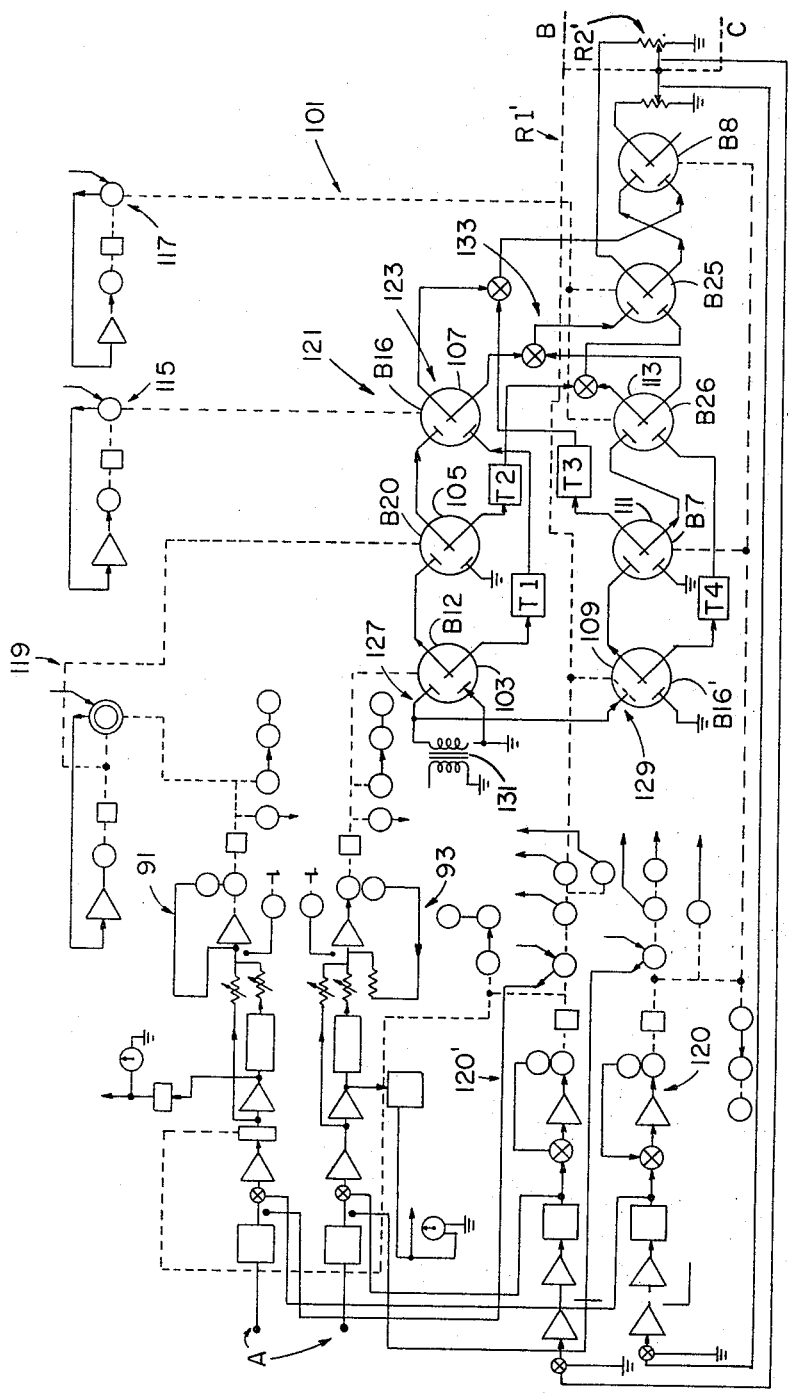
FIG. 3 is a partial schematic drawing of the servo-chassis of the tracking apparatus of FIG. 1.

Referring to FIG. 3, these stabilized azimuth and elevation servos 91 and 93 position resolvers B–20 and B–12 in coordinate converter 101. This coordinate converter 101 also contains resolvers B–16, B–25 and B–26, which are positioned by inputs from aircraft servos 115 and 117 whose positions correspond to the aircraft pitch and roll. Resolver B–20 is positioned by heading servo 119, resolver B–7 is positioned by azimuth servo 120 and resolver B–16′ is positioned by elevation servo 120′. Resolvers B–25 and B–8 are connected with secant potentiometers R1′ and R2′.

In accordance with this invention, the coordinate converter 101 converts the stabilized elevation, stabilized azimuth, heading, pitch and roll angles into the proper elevation and azimuth pedestal angles. To this end, the coordinate converter 101 of this invention comprises a six resolver chain which is split in the middle into first section 121 and second section chain 123, and is energized at both ends 127 and 129, e.g. by a 26 v. AC, 400 c.p.s. reference voltage source 131. The input information works its way through the two half-chains 121 and 123 toward the middle 133, where the information combines to provide error signals at B and C for the azimuth and elevation servos 51 and 41 that position the pedestal 35 and antenna 31. Thus, buffer amplifiers are eliminated from between the resolvers and the excitation voltage attenuation is minimized by only a three resolver chain.

Referring to FIG. 4, coordinate converter 101, comprises matrix chain of resolvers 103, 105, 107, 109, 111 and 113, each of which is positioned by its respective servo. In addition to the resolvers, the matrix has four variable transformers T1, T2, T3 and T4 and two secant function potentiometers R1′ and R2′ positioned by the pedestal elevation axis, and phase trimming resistors. The transformers balance the electrical loading at the outputs of their respective resolvers whereby the three error signals, shown as $E_1$, $E_2$ and $E_3$, are combined by the two sub-resolver chains 121 and 123 into pedestal azimuth and elevation servo errors. Meanwhile, the two secant function potentiometers R1′ and R2′, which are mounted on the pedestal elevation shaft 151, automatically provide the proper gain control.

Advantageously, a 26 v. AC, 400 c.p.s., reference voltage ($\phi A$) is impressed across leads 201 and 203. Lead 201 is connected in parallel to resolver B–12 through resistor 205 and to resolver B–16′ while lead 203 is connected in parallel to resolvers B–12 and B–16′. Resolver B–12 connects in chain 121 with resolvers B–20 and B–16 through lead 207 and lead 209 and parallel leads 211 and 213. Resistor 215 is inserted in lead 207 between resolvers B–12 and B–20 and resistor 217 is inserted in lead 209 between resolvers B–20 and B–16. Transformer T1 is connected as a dummy or balance between resolvers B–12 and B–16 in first chain 121 by leads 223 and 225 and parallel leads 227 and 239 and lead 223 having a resistor 231 between resolver B–12 and transformer T1. Transformer T2 is similarly connected as a dummy or balance between resolver B–20 in the first chain 121 and resolvers B–26 and B–25 in the second chain 123. To this end lead 233 (through a resistor 235) and lead 237 connect resolver B–20 with transformer T2. Transformer T2 connects with resolver B–26 through lead 239′ and connects with resolver B–25 through lead 241.

In the second resolver chain 123, resolver B–16′ connects with resolvers B7, B26, B25 and B8 as follows: leads 245 and 247 connect resolvers B16′ and B7; parallel leads 249 and 251 connect resolver B16′ to dummy balance transformer T4 and thence to resolver B26 through leads 253 and 255 (lead 249 having a resistor 257 therein); resolver B7 connects with resolver B26 through leads 259 and 261; resolver B26 connects with resolver B25 through leads 263 and 265; and resolver B25 connects with resolver B8 through leads 267 and 269. It is noted that resolver B7 in chain 123 connects with resolver B16 through lead 271, dummy balance transformers T3 and lead 273, and resolver B7 connects with resolver B8 through lead 275, transformer T3, lead 277 and resistor 279. Also, resolvers B25 and B8 connect with resolvers B16 through leads 281 and 283, the voltage across leads 277 and 283 being equal to the error signal $E_1$ between these output leads of resolvers B16 and B7.

The three error signals $E_1$, $E_2$ and $E_3$ are combined by the two-resolver chain into pedestal azimuth and elevation servo errors by connections between potentiometers R1′ and R2′ and resolvers B25 and B8. To this end leads 285 and 287 connect the resolver B25 outputs to the opposite sides of potentiometer R1′ and leads 289 and 291 connect the resolver B8 outputs to the opposite sides of potentiometer R2′.

$A'$=actual pedestal position, $A$=stabilized pedestal position, $$R_{1-3} = (S_{1-3} \cos \theta - S_{2-4} \sin \theta) T_R \text{ and}$$
$$R_{2-4} = (S_{1-3} \sin \theta + S_{2-4} \cos \theta) T_R$$

The designation for the resolvers are as follows: S1 and S3 are the two opposite ends of one stator winding therein; S2 and S4 are the two opposite ends of another stator winding therein; R1 and R3 are the two opposite ends of one rotator winding; and R2 and R4 are the two opposite ends of another rotor winding. These stator and rotor windings are in spaced quadrature as is conventional. The mechanical inputs to the respective resolvers are on the rotator shafts. Thus the voltage across R1 and R3 is proportional to the voltage across S1 and S3 times the cos of the shaft angle; the voltage across R2 and R4 is proportional to the voltage across S2 and S4 times the sin of the shaft angle; and when there is a voltage across S1 and S3 and S2 and S4 the voltage across the outputs R1 and R3 and R2 and R4 is the sum of the inputs. In the transformer S1 and S3 and R1 and R3 are the opposite ends of their respective windings therein.

The terms used are defined as follows:

$E$=stabilized elevation angle
$H-A$=heading minus stabilized azimuth angle
$P$=pitch angle
$R$=roll angle
$E'$=pedestal elevation angle
$A'$=pedestal azimuth angle The coordinate converter is designed assuming the following conventional phasing and sequence of rotation:

First, rotation through heading in horizontal plane is defined as positive in the clockwise direction measured from North. Second, rotation in pitch is defined as positive with the nose of the aircraft down. Finally, rotation in roll is defined as positive with starboard side up.

If a set of coordinates were established, such as aircraft coordinates defined by the unit vectors $\bar{x}_a$, $\bar{y}_a$ and $\bar{z}_a$ due to a heading, pitch and roll angle, then the range vector ($\bar{T}$) can be described in aircraft coordinates $$\bar{T} = \bar{x}_a T_{xa} + \bar{y}_a T_{ya} + \bar{z}_a T_{za}$$

where $T_{za} = T \sin E'$, $T_{xa} = T \cos E' \cos A'$ and $$T_{ya} = T \cos E' \sin A'$$

The unit vectors $\bar{x}_a$, $\bar{y}_a$ and $\bar{z}_a$ can be expressed in terms of the earth coordinate unit vectors $\bar{x}_e$, $\bar{y}_e$, $\bar{z}_e$ and the angles H, P, and R. The range vector in earth coordinates is: $\bar{T} = \bar{x}_e \cos E \cos A + \bar{y}_e \cos E \sin A + \bar{z}_e \sin E$.

The resolver chain is designed so that error voltages at E' error (HI) and A' error (HI) drive the E' and A' servos until a null appears at these two points. Driving these two points to a null will in turn produce nulls at $E_1$, $E_2$ and $E_3$.

In operation the two resolver chains and the secant potentiometers are aligned to the proper relationship, and with the index being at $E'=70°$ and $E0=26E_{in}$. There are two points on the secant potentiometers where the proper ratio is obtained. First, the variable transformers T1, T2, T3 and T4 set up the following conditions $E=0°, H=0°, A=180°, P=0°, E'=0°, A'=180°, R=0°$ and T3 is adjusted for null at $E_1$. Following this they are set to the following conditions: $E=0°, H=-90°, A=180°, P=0°, E'=0°, A'=-90°, R=0°$ and T2 is adjusted for null at $E_3$. Then the transformers are set to the following conditions: $E=90°, H=90°, A=180°, P=90°, E'=0°, A'=180°, R=0°$ and $T_1$ is adjusted for null at $E_1$. Finally, they are set to the following conditions: $E=80°, H=-90°, A=180°, P=0°, E'=80°, A'=180°, R=0°$ and $T_4$ is adjusted for null at $E_2$.

The following tests show that the coordinate converter 101 is operating properly: With roll and pitch angle at zero, show that $A'=A-H$; with stabilized azimuth at 180°, stabilized elevation equal to zero, roll and heading equal to zero, show that $E'=-P$; with stabilized azimuth at 180°, stabilized elevation equal to zero, heading and pitch at zero, show that $E'=E=0$ and $A'=A=180°$ for any roll angle; with stabilized azimuth at 90°, stabilized elevation at zero degrees, heading and pitch at zero, show that $E'=-R$; and using the following table, insert the given input angles and show that the computed output angles are obtained:

INPUT SETTINGS

| | Problem 1 | Problem 2 | Problem 3 | Problem 4 | Problem 5 |
|---|---|---|---|---|---|
| Stab. Az | 0° | 0° | 0° | 0° | 0° |
| Stab. $E_1$ | 30° | 60° | 45° | 45° | 45° |
| Heading | 315° | 315° | 120° | 120° | 120° |
| Pitch | −10° | −10° | −10° | +10° | +10° |
| Roll | −10° | −10° | −10° | −10° | +10° |
| Unstab. Az | 37°15' | 22°55' | 236°34' | 236°34' | 226°18' |
| Unstab. $E_1$ | 29°7' | 57°14' | 39°47' | 31°16' | 47°1' |

In one typical embodiment the servomotors, tachometers, control transmitters and resolvers for azimuth and elevation are 400 cycle elements, with the motors having suitable brakes that lock the pedestal under conditions of power absence and safe operation and having suitable limit switches that provide electrical limit stop to the drives just before reaching their azimuth and elevation mechanical limits. The pedestal makes use of a two-axis elevation-over-azimuth configuration. Both axes are gear-driven with limit stops in azimuth travel to ±170° and elevation travel to +85° and −28°. The secant function potentiometer outputs are proportional to the secant of the pedestal elevation angle. The R1' and R2' potentiometers are in the coordinate converter 101 and a secant potenionmeter used in the tracking loop provides a gain change that is proportional to the secant of the pedestal elevation angle. The local oscillators and the IF amplifiers permit operation at 6.040 kmc., 6.310 kmc. or at both frequencies. In the mixer, the IF amplifier operates in the 5.9 to 6.8 kmc. region with an operating frequency of 30 mc. at a nominal bandwidth of 1.0 mc. and information modulation at 30 c.p.s. The un-numbered amplifiers are illustrated schematically as triangles.

In the automatic mode, the servo chassis receives the tracking azimuth and elevation D-C signals from the receiver. These signals are modulated with a 400 c.p.s. carrier and are fed to the stabilized azimuth and elevation servos. In this the search mode, the circuitry is identical to the manual stabilized mode, except that a search signal is summed with the output of the coordinate converter 101 it being noted that the signal from the B7 resolver drives the azimuth pedestal axis ±6.5°. A similar circuit is present in the elevation channel so that the elevation pedestal axis is also driven ±6.5° with azimuths and elevation signals 90° out of phase with each other and the pedestal searching in a circular pattern of 13° diameter every 4 sec.

In the remote mode, azimuth and elevation control transformer signals are accepted from the pedestal and fed to the stabilized azimuth and elevation servos. The stabilized azimuth and elevation servos position the synchro control transmitters which are used to deliver output analog data and to transmit positional data to repeater synchros that drive front panel dials. In addition, the stabilized azimuth and elevation servos position resolvers in the coordinate converter and the system operates as a closed positional loop where the stabilized servo couples its positional information to the pedestal servo through the coordinate converter 101.

In the full auto mode, the system operates in a similar manner to the remote mode. However, instead of using synchros for positional input commands, the error voltage is developed by the antenna receiver system. Also, a secant potentiometer in the pedestal gear train serves to modify gain in the azimuth tracking loop as a function of the pedestal elevation angle.

This invention has the advantage of providing a fast, accurate and efficient airborne tracking system for use in plotting the coordinates of two relatively moveable points. The system of this invention, moreover, has the advantage of simplicity, accuracy and compactness by providing a simple and efficient coordinate converter system. In one embodiment, this coordinate converter converts a plurality of informational inputs into a combined output with low attenuation and without buffer amplifiers. Also, this invention is highly flexible for a wide range of positions, speeds and ranges.

What is claimed is:

1. In an airborne tracking system for an aircraft relative to a ground beacon wherein a plurality of coordinate input information signals are used to direct an antenna toward the beacon, a coordinate converter, comprising a matrix of resolvers for receiving said input information to produce a combined output signal, said matrix having energization means at both ends and said input information signals working their way through two half-chains toward the middle of said matrix to produce output error signals corresponding to the combined input signals for moving said antenna to direct it toward said beacon.

2. The invention of claim 1 in which said input information signals, comprise signals corresponding to the aircraft heading, pitch and roll and said output error signals correspond to the required azimuth and elevation angles for said antenna relative to said beacon.

References Cited

UNITED STATES PATENTS 2,750,545  6/1956  Davis _____ 318—19
2,947,986  8/1960  Marner et al. _____ 343—117

RODNEY D. BENNETT, *Primary Examiner.*

RICHARD E. BERGER, *Examiner.*